United States Patent Office 3,277,607
Patented Oct. 11, 1966

3,277,607
FIXATION OF RADIOACTIVE CONTAMINATION IN SOIL
Roy Overstreet, Berkeley, Calif., assignor to the United States of America as represented by the United States Atomic Energy Commission
No Drawing. Filed Dec. 30, 1964, Ser. No. 422,468
4 Claims. (Cl. 47—58)

This invention relates to soil chemistry and more particularly to a process for immobilizing radioactive material which has been deposited on land surfaces whereby the land may safely be used for agricultural purposes. The process, for example, prevents the uptake of radioactive soil contaminants by growing plants. The invention described herein was made in the course of, or under, Contract AT(11–1)–34, Project Agreement 23, with the United States Atomic Energy Commission.

It has been recognized that radioactive contamination of large agricultural areas would present serious food supply problems within a very short period. Such contamination is rapidly taken up by the roots of plants and is frequently incorporated into the edible section of the plant which may then be unsafe for consumption by humans or grazing animals. Also, attempts to grow plants in contaminated soil frequently result in a dwarfed or misshapened plant. Although it is possible in some cases to cause accelerated growth by radiation effects, generally it is deleterious and undesirable.

The dispersal of radioactive contamination over farming or grazing lands could come from a catastrophic disruption of nuclear facilities, atmospheric nuclear explosive detonations, or nuclear warfare. While the deposited radioactivity will decay to a safe level in a period of years, it might not be possible to withhold large areas from production for a long period as severe food shortages could result. Thus, it is of obvious importance to return the contaminated land to the normal production of uncontaminated foodstuffs as rapidly as possible. In the absence of economical corrective measures, this may be delayed by many years if the long-lived radioactivity, for example $Sr^{90}$, is allowed to remain on the soil in its original state, as there is a significant uptake of such radioactive fallout products by the roots of living plants.

Prior methods to solve the problem of contamination have attempted the physical removal of the radionuclides by leaching, or actual removal of the contaminated soil. However, these techniques are not economically feasible for large areas. Another method attempted has been asphaltic spraying of the soil, which was unsuccessful due to crumbling of the soil and asphalt, and also due to bacterial action on the asphalt. Heretofore, all of the prior methods have been largely unsuccessful in rendering the soil useful after radioactive contamination.

It has now been discovered that a thin layer of organosilicone applied to a radionuclide contaminated land surface will inhibit the uptake of radioactivity by the plant roots. The silicone is dissolved in a suitable diluent and applied to the top of the land surface. The radioactive contaminants are thereby bound into the surface soil particles and thus immobilized. Silicone compounds are hydrophobic and have good resistance to weathering and microbial action, and thus are well suited for this process. Soil particles which are adequately coated in this manner will not subsequently contribute nutrients to adjacent plant roots and, consequently, the contamination will not be taken up by crops or natural forage grasses growing in the affected soil.

The presence of the coated radioactive particles on the surface of the soil may constitute a hazard from other standpoints than that of assimilation into plants. In addition, radioactive material might be released from such soil particles where the soil is subject to abrasion. Accordingly, the coating step is preferably followed by the plowing under of the treated surface layer of the soil to a greater depth than is customary in ordinary agricultural cultivation. By this means further scattering of the contamination is forestalled, scattering or pulverizing of the coated particles from activity on the land surface is prevented, and shielding for the radioactivity is provided.

Therefore it is an object of this invention to provide a process for restoring radioactively contaminated land to a safe and productive status.

Another object of the invention is to provide a process whereby radioactive contaminants on a land surface are prevented from being taken up by the root system of a growing plant.

Another object of this invention is to prevent the possibility of a food shortage due to the radioactive contamination of extensive areas of arable land.

This process is applicable to all types of soil. It has been found particularly suitable for a soil having a fine aggregate such as a very fine sandy loam (V.F.S.L.) because the aggregate is not easily broken subsequent to the silicone application. A large soil aggregate such as a clay is more readily broken, causing the silicone coating to be less efficient as some radionuclide may be released by such breakage.

Theoretically, it would require only a silicone layer of monomolecular thickness on the soil surface to completely occlude the radionuclides on a soil aggregate. However, in actual practice the silicone is difficult to distribute evenly and thus requires a heavier application. The radionuclides that are deposited on a land area will tend to remain on the topmost surface for a considerable period of time, if undisturbed. However, the nuclides will slowly diffuse into the soil, thus mking it more difficult to bind the nuclides to the soil particles by use of the silicone application. Therefore, it is desirable to complete the silicone application as soon as possible after the contamination occurs.

Although strontium tracers ($Sr^{85}$ and $Sr^{89}$) have been utilized as the radioactive contaminant during the development of the process, it is to be understood that the inactivation process applies to radioactive isotopes in general (also referred to as radionuclides) and is applicable to those radionuclides found as the products of uranium fission or plutonium fission. This would include radionuclides from atomic number 30 (zinc), up through and including the isotopes of atomic number 66 (dysprosium). $Sr^{85}$ and $Sr^{89}$ are preferable as experimental tracer isotopes because of their short half-life. Such isotopes decay to a safe level in a shorter period. $Sr^{90}$ is not used for test purposes, although it is the most commonly discussed isotope of nuclear fallout, as it has a half-life of 28 years and therefore takes too long to decay to a safe level.

A wide variety of organosilicone compounds are usable as occluding agents including some which are as yet unavailable commercially. Silicones come in a wide variety of mixtures, formulations and chain configuration, all having various end blocking radicals. In general, those organosilicones having an active site available for additional cross linking or surface polymerization are more effective as surface active agents, and thus are useful in this invention. This typically comprises those organosilicone compounds classified as organochlorosilanes, alkylpolysilanes, polysiloxanes, siliconates and alkoxysilanes.

It has been found that deeper surface penetration of the silicone gives a higher occlusion of the radionuclides on the soil aggregate. A long chain silicone polymer of high molecular weight tends to penetrate only to a depth of less than about one millimeter. To attain any greater depth of penetration would require an extremely heavy dose of silicone. However, by use of a chlorinated organosilicone monomer of the formula $R_x$—Si—$Cl_{4-x}$, where R is an organic radical, a deeper penetration is obtained with the subsequent polymerization of the monomer to a polymer on contact with water in the soil by the reactions:

$$R_x-Si-Cl_{4-x} + HO \rightarrow R_x-Si-(OH)_{4-x} + HCl \quad (1)$$

$$R_x-Si-(OH)_{4-x} \rightarrow [R-Si-O_{1.5}]_n + H_2O \quad (2)$$

The silanol formed in Equation 1 is unstable and condensations form between silanol molecules with the elimination of water to form the long chain polysiloxane as shown in Equation 2. The polysiloxane, $[R-Si-O_{1.5}]_n$, retains two active sites for additional surface or cross-linking polymerization reactions. In tests it has been shown that the monomer has penetrated over the one millimeter depth attained with the long chain silicone polymers.

The toxicology of silicones has been studied widely and it has been concluded by various researchers that minor quantities of organosilicones will pass through the digestive tract unabsorbed with no ill effects. Therefore the silicone application can be performed on a land surface with edible foodstuffs growing thereon, wherein the foodstuffs has been previously decontaminated of the radioactivity. Application of the silicone to the contaminated soil surface will thus permit further growth although some silicone will reside on the growing foodstuff.

The following example will illustrate more fully the present invention: To initially test the effectiveness of the various silicones available, a rapid test procedure was developed to determine the relative rates of dissolution of the soil after the silicone application. A solution of $Sr^{85}(NO_3)_2$ in water was made up with an initial specific activity of 11,016 mc./gm. The solution was allowed to sit for 8 months until the activity had decreased by about 4 half-lives and the count was 80,000 c.p.m. Twenty-five grams of air dry soil were tamped down in each of several pots. One ml. of the above described $Sr^{85}$ solution was dripped on the surface of the soil in each beaker, using a 1 ml. polythene pipette. The contaminated soil samples were air dried under heat lamps for a period of 24 hours. Various silicone formulations were applied to the surface of the potted contaminated soil samples and were likewise dried under heat lamps for 24 hours. One potted soil sample was not treated with silicone and was used as a control for purposes of subsequent comparison. The soil samples were then extracted by adding 50 ml. of 1.0 N $SrCl_2$ to each and disrupting the crust with a stirring rod. The soil samples were then capped and shaken at a rate of approximately 150 cycles/min. for ½ hour. The samples were filtered and 5 ml. of each extract was counted with a standard Geiger counter. The amount of $Sr^{85}$ extracted, compared to the control sample (no silicone treatment), ranged from a low of 7% to 75% extracted. Therefore, those silicones which showed high retention of the $Sr^{85}$ as shown by the low extraction rate were then used in the actual growth tests where the nuclide uptake is measured from plants.

Three silicone compounds showing the least extraction of the $Sr^{85}$ were picked for the growth tests and included sodium methyl siliconate and formulation R–20 of the Union Carbide Corporation, New York, N.Y. R–20 is a resin mixture having an organopolysiloxane as the primary silicone.

Eight pots of 8 inches in diameter were filled with 2 kilograms of Hanford air-dry V.F.S.L. A solution of $Sr^{85}$ isotope was made, having a $Sr^{85}$ content of 0.074 mg. in 200 ml. of water, the specific activity being 8000 mc./g. Twenty ml. of this solution was dripped onto the surface of each pot. The pots were placed under heat lamps for 24 hours. Fifty ml. of the aforementioned silicone solutions were applied to the soil surface of each pot with the proportions shown in Table A, below. Six romaine lettuce seedlings were planted in each pot and the pots were placed in a Phytotron growth chamber having a 16 hour day at 23° C. and 8 hour night at 14° C. The light intensity was 3000 foot-candles.

At the end of 45 days the top section of the romaine lettuce plants were harvested and ground in a Wiley Mill with a #20 screen. Two ½ gram samples were counted and the following results obtained as shown in Table A.

*Table A*

| Pot | Silicone | Silicone concentration, percent | Background Count, c.p.m. | Net Counts Per Minute | Average Percent Uptake, $Sr^{85}$ |
|---|---|---|---|---|---|
| 1 | R–20 | 4 | | 1,583 | } 59.2 |
| 2 | R–20 | 4 | | 1,710 | |
| 3 | R–20 | 10 | | 1,725 | } 63.7 |
| 4 | R–20 | 10 | | 1,822 | |
| 5 | Control | | | 2,906 | } 100 |
| 6 | ...do | | | 2,664 | |
| 7 | Sodium methyl siliconate | 4 | | 1,351 | } 47.2 |
| 8 | ...do | 4 | | 1,275 | |
| 9 | Water | | 17.2 | | |

As can be seen from Table A, a reduction in uptake of 52.8% is obtained from pots 7 and 8.

In practice the silicone treated soil layer is preferably not allowed to remain on the land surface but is further removed and immobilized by plowing under, preferably to a depth greater than that of the zone of normal agricultural cultivation. Suitable plows for performing this operation are known to the art.

While the invention has been described with respect to particular embodiments and examples, it will be apparent that variations and modifications are possible within the spirit and scope of the invention and it is not intended to limit the invention except as defined in the following claims.

What is claimed is:
1. A method to render radioactive fallout on a land surface inert to the biological processes of the soil of said land, comprising, applying to the surface of said land a solution of a diluent having dissolved therein an organosilicone base compound of about 1 to about 10% silicone concentration thereby occluding said radioactive contamination on the surface soil aggregate, and subsequently plowing under said surface soil aggregate.

2. A method to render radioactive fallout on a land surface inert to the biological processes of the soil of said land as described in claim 1, wherein the silicone base compound is a chlorinated organosilicone monomer.

3. A method to render radioactive fallout on a land surface inert to the biological processes of the soil of said land as described in claim 1, wherein the silicone base compound is comprised essentially of sodium methyl siliconate.

4. A method to render radioactive fallout on a land surface inert to the biological processes of the soil of said land, comprising the steps, spraying the surface of said land with a solution of a diluent having dissolved therein an organosilicone compound having a silicone concentration of about 1 to about 10% selected from the group consisting of organochlorosilanes, siliconates, alkylpolysilanes, alkoxylsilanes, polysiloxanes and plowing under the surface layer of said land to a depth greater than that of normal argricultural cultivation.

No references cited.

ABRAHAM G. STONE, *Primary Examiner.*

R. E. BAGWILL, *Assistant Examiner.*